(12) United States Patent
Oberschachtsiek et al.

(10) Patent No.: US 6,519,511 B1
(45) Date of Patent: Feb. 11, 2003

(54) DEVICE FOR DISPLAYING AND CONTROLLING FUNCTIONS IN A MOTOR VEHICLE

(75) Inventors: André Oberschachtsiek, Gifhorn (DE); Bernd Schlepper, Wolfsburg (DE); Susanne Dirksen, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/092,731

(22) Filed: Jun. 5, 1998

(30) Foreign Application Priority Data

Jun. 14, 1997 (DE) .......................... 197 25 235

(51) Int. Cl.7 ................................ H04B 1/06
(52) U.S. Cl. ................ 701/1; 701/29; 701/30; 701/31; 701/32; 455/68; 455/63
(58) Field of Search ................ 701/1, 29, 30, 701/31, 32, 33, 36, 102, 101, 100, 99; 455/63, 68

(56) References Cited

U.S. PATENT DOCUMENTS

| 4,584,603 | A | * | 4/1986 | Harrison | 358/86 |
|---|---|---|---|---|---|
| 4,788,588 | A | * | 11/1988 | Tomita | 358/93 |
| 4,866,515 | A | * | 9/1989 | Tagawa et al. | 358/86 |
| 5,290,088 | A | | 3/1994 | Hanagan et al. | 297/188.04 |
| 5,794,164 | A | * | 8/1998 | Beckert et al. | 701/1 |
| 5,829,782 | A | * | 11/1998 | Breed et al. | 280/735 |
| 5,854,969 | A | * | 12/1998 | Gullner | 455/68 |
| 6,009,355 | A | * | 12/1999 | Obradovich | 701/1 |
| 6,058,288 | A | * | 5/2000 | Reed et al. | 455/6.3 |

FOREIGN PATENT DOCUMENTS

| DE | 296 08 032 | | 8/1996 |
|---|---|---|---|
| EP | 511 010 A2 | | 10/1992 |
| EP | 701 926 | | 3/1996 |
| JP | 363173731 A | * | 7/1988 |

* cited by examiner

Primary Examiner—William A. Cuchlinski, Jr.
Assistant Examiner—Marthe Y. Marc-Coleman
(74) Attorney, Agent, or Firm—Cohen, Pontani, Lieberman & Pavane

(57) ABSTRACT

A device for displaying and controlling functions in a motor vehicle. The device includes at least one master operating panel and at least one slave operating panel, which are connected to one another bidirectionally. It is possible to represent and actuate all the existing functions via the master operating panel, and it is possible to assign functions to the slave operating panel via the master operating panel in a programmable fashion. The functions can be represented and actuated by the slave operating panel.

10 Claims, 1 Drawing Sheet

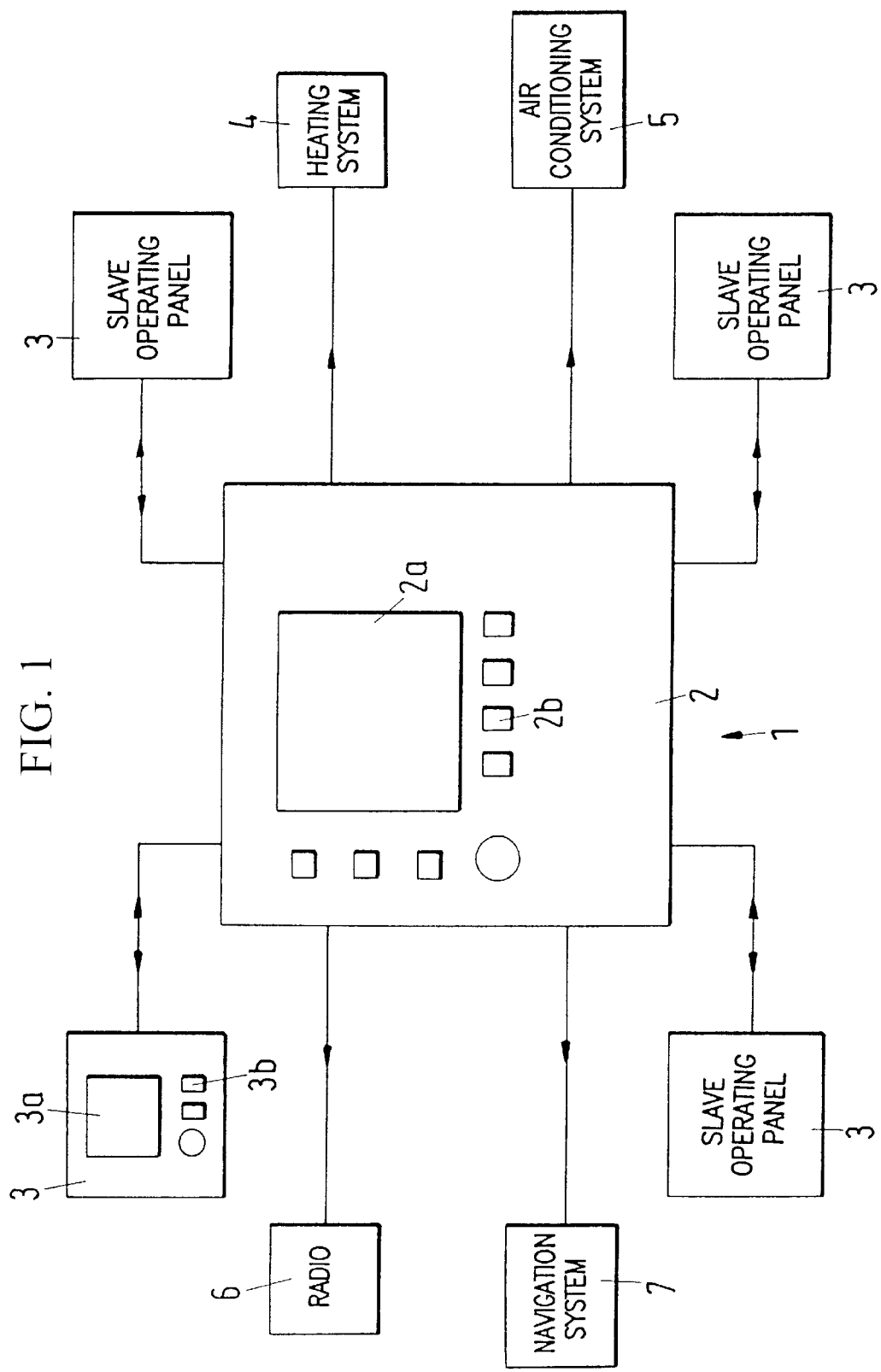

DEVICE FOR DISPLAYING AND CONTROLLING FUNCTIONS IN A MOTOR VEHICLE

BACKGROUND OF THE INVENTION

1. Field of the Invention

The invention relates to a device for displaying and controlling functions in a motor vehicle.

2. Discussion of the Prior Art

Generally, great efforts are being made to make travelling in various means of transport extremely varied and convenient. This includes making a certain amount of information available to passengers.

In railroad technology, for example, an interactive digital information and entertainment system is known, in which a plurality of terminals each with a screen and an input device are connected to a central computer. The central computer is connected to all the a railroad cars via a digital bus system for transmitting data. In particular, in each car there is a display input means on which a passenger can interrogate information regarding the journey, for example possible connecting trains at the destination station. In addition, the passengers are provided on the seat with headsets via which they can receive announcements from the personnel on the train and/or radio transmissions. Depending on the route, the central computer ensures optimum tuning to the channels to be received during the radio schedule.

Video devices are also installed for some of the passengers. The screens of the video devices are, if constructionally possible, fitted into the backrest of a seat which is located, in the seating direction, in front of the passenger's seat to which the screen is assigned, and are thus located in the field of vision of the passenger in an optimum way in terms of distance and height. These video devices are fed via a separate RF network for relaying the video transmissions.

German reference DE 296 08 032 discloses such a system in which, in order to increase passenger convenience, in each case a terminal of the information system is assigned to a passenger's seat. At least one screen of the terminal is integrated into the backrest of the passenger's seat which is located, in the seating direction, in front of the passenger's seat to which this terminal is assigned. A disadvantage with this system is that the system provides the user with very few possibilities for influencing it and is essentially restricted to hi-fi and video playback, which is known already from buses and aircraft. However, such systems are not suitable for automobiles due to their lack of flexibility.

SUMMARY OF THE INVENTION

Accordingly, it is an object of the present invention is based on the technical problem of providing a device for displaying and controlling functions in a motor vehicle which provides increased convenience.

Pursuant to this object, and others which will become apparent hereafter, one aspect of the present invention resides in a device having a master operating panel, which includes a display and at least one operating unit, and at least one slave operating panel, likewise including a display and an operating unit, which are connected to one another bidirectionally. It is possible to use the master operating panel to represent and actuate all the existing functions and it is possible to assign functions to the slave operating panel by means of the master operating panel in a programmable fashion. These functions can be represented and actuated by means of the slave operating panel. Certain information and control possibilities can be assigned to said functions depending on the type of vehicle occupants. If, for example, the vehicle occupants are children, they will predominantly be provided with only display information, since actuation of functional assemblies is generally not desired. On the other hand, when necessary, a vehicle occupant can be provided with the possibility of actuating functional assemblies such as a heating system, an air conditioning system or the radio, for example.

In a further embodiment of the invention, the master operating panel is assigned to the driver of the motor vehicle. Preferably the slave operating panels are arranged at the rear seating compartment in or on the rear side of the driver's and/or the front passenger's seat.

In yet another embodiment, the operating panels are designed as multifunctional operating devices in which a selection of individual functions is made within a functional group by means of a single first operating element. Here, the selection of the functional assemblies assigned to the individual functions is carried out by means of second operating elements which are superordinate to the functional assemblies. As a result, double assignment of one or more operating elements for the selection of the superordinate functions can be avoided, so that simple handling is ensured even for a large number of complex functional assemblies.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The single FIGURE shows a schematic block circuit diagram of a device for displaying and controlling functions in a motor vehicle pursuant to the present invention.

DETAILED DESCRIPTION OF THE PREFERRED EMBODIMENT

The device 1 for displaying and controlling functions in a motor vehicle includes a master operating panel 2, composed of a display and at least one operating unit 2b, and a plurality of slave operating panels 3, composed of a display 3a and at least one operating unit 3b. The master operating panel 2 is connected case bidirectionally to each slave operating panel 3. Furthermore, the master operating panel 2 is connected to functional assemblies, for example a heating system 4, an air conditioning system 5, a radio 6 and a navigation system 7. It is also possible for the functional assemblies to be assigned to any or all of the slave operating panels 3, as desired. However, a prerequisite is that both the master operating panel 2 and, if appropriate, all the other slave operating panels 3 can access the respective functional assembly.

By means of the master operating panel 2, which is preferably assigned to the driver of the motor vehicle, each individual slave operating panel 3 is assigned an operator authorization for one or more of the functional assemblies, which authorization can then be displayed and/or actuated by the slave operating panel 3.

In order to keep the wiring complexity low, the communication from a slave operating panel 3 to a functional assembly always takes place via the master operating panel 2. Here, the operator authorization for a functional assembly can be assigned simultaneously to a plurality of slave operating panels 3. In this case, the master operating panel 2 additionally assigns priorities to the individual slave operating panels 3. As a result, when there are different control signals for a functional assembly from a plurality of slave operating panels 3, the master operating panel 2 can decide which signal is passed on to the functional assembly. In this way, depending on what kind of front seat passenger and vehicle occupants the driver of the motor vehicle has, he can assign them specific functional assemblies which they can then call up on their display or actuator. Furthermore, it is possible for the operator authorization for specific functional assemblies to be assigned to the slave operating panels 3 as standard practice. Furthermore, specific combinations of functional assemblies are combined in groups, so that the assignment for a slave operating panel 3 is simplified.

The invention is not limited by the embodiments described above which are presented as examples only but can be modified in various ways within the scope of protection defined by the appended patent claims.

We claim:

1. A device for displaying and operating functions in a motor vehicle, comprising:

at least one master operating panel;

at least one slave operating panel, the master operating panel and the slave operating panel being connected to one another bidirectionally, the master operating panel being operative to display and operate all available functions of a master field and to selectively at least one of assign and change at least one function from the master field to the at least one slave operating panel in a variably programmable fashion so that the assigned functions can be displayed and operated by the at least one slave operating panel.

2. A device according to claim 1, wherein the master operating panel is assignable to a driver of the motor vehicle.

3. A device according to claim 1, wherein the slave operating panel is arranged in a rear passenger compartment of the vehicle.

4. A device according to claim 1, wherein at least one of the master operating panel and at least one slave operating panel is a multifunctional operating device.

5. A device according to claim 1, wherein a plurality of slave operating panels are provided and specific vehicle functions are combined in groups that are assignable as a group to one of the slave operating panels.

6. A device according to claim 1, wherein the master operating panel is directly connected to the functions to be operated by functional assemblies of the motor vehicle, the at least one slave operating panel being in operative communication with the functional assemblies via the master operating panel.

7. A device according to claim 1, wherein the master operating panel and the at least one slave operating panel are assigned to functional assemblies of the vehicle for operating the vehicle functions, the master operating panel being operative to authorize the at least one slave operating panel to operate at least one of the functional assemblies.

8. A device according to claim 1, wherein a plurality of slave operating panels are provided, the slave operating panels being in operative communication with the master operating panel so that at least two of the slave operating panels can operate the same functional assemblies.

9. A device according to claim 8, wherein the master operating panel is operative to assign different priorities to the individual slave operating panels for operating a common functional assembly.

10. A combination, comprising: a motor vehicle having functional assemblies; and means for displaying and controlling the assemblies of the motor vehicle, the displaying and controlling means including at least one master operating panel and at least one slave operating panel which are connected to one another so as to transmit signals bidirectionally, the master operating panel being operative to display and operate the functional assemblies of the motor vehicle contained in a master field and to selectively at least one of assign and change at least one of the functional assemblies from the master field to the at least one slave operating panel in a variably programmable fashion so that the assigned functional subassemblies can be displayed and operated by the at least one slave operating panel.

* * * * *